(12) United States Patent
Maloy

(10) Patent No.: US 10,873,514 B2
(45) Date of Patent: Dec. 22, 2020

(54) NEIGHBOR MONITORING IN A HYPERSCALED ENVIRONMENT

(71) Applicant: Jon Maloy, Montreal (CA)

(72) Inventor: Jon Maloy, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 148 days.

(21) Appl. No.: 16/079,413

(22) PCT Filed: Mar. 1, 2016

(86) PCT No.: PCT/IB2016/051130
§ 371 (c)(1),
(2) Date: Aug. 23, 2018

(87) PCT Pub. No.: WO2017/149354
PCT Pub. Date: Sep. 8, 2017

(65) Prior Publication Data
US 2019/0014025 A1    Jan. 10, 2019

(51) Int. Cl.
*G06F 15/173*    (2006.01)
*H04L 12/26*    (2006.01)
*H04L 12/24*    (2006.01)

(52) U.S. Cl.
CPC ........ *H04L 43/0811* (2013.01); *H04L 41/044* (2013.01); *H04L 41/12* (2013.01); *H04L 43/10* (2013.01); *H04L 43/12* (2013.01)

(58) Field of Classification Search
CPC ..... H04L 43/0811; H04L 43/10; H04L 43/12; H04L 41/044; H04L 41/12
See application file for complete search history.

(56) References Cited

U.S. PATENT DOCUMENTS

| | | | |
|---|---|---|---|
| 6,449,641 B1* | 9/2002 | Moiin | G06F 9/5061 |
| | | | 709/201 |
| 2005/0080883 A1* | 4/2005 | Nurminen | H04L 41/0893 |
| | | | 709/221 |

(Continued)

FOREIGN PATENT DOCUMENTS

| | | |
|---|---|---|
| WO | 2006/067271 A1 | 6/2006 |
| WO | 2008/110202 A1 | 9/2008 |

OTHER PUBLICATIONS

Yamamoto I. et al.: "A Hierarchical Multicast Routing Using Inter-Cluster Group Mesh Structure for Mobile Ad Hoc Networks"; 12 pages; Jan. 1, 2009.

(Continued)

*Primary Examiner* — Padma Mundur
(74) *Attorney, Agent, or Firm* — Haizhen Jin; Ericsson Canada Inc.

(57) ABSTRACT

A network of N nodes performs a monitoring method, where the method is performed by each node. The N nodes are partitioned into domains according to a sorted order. The domains include a local domain in which the node is located and one or more remote domains. Each remote domain has a domain head designated to monitor member nodes in the remote domain. The node sends probes at a given frequency to actively monitored nodes that include all other member nodes in the local domain and domain heads in the remote domains. The node then determines whether each of the actively monitored nodes is up based on replies received from the actively monitored nodes in response to the probes.

27 Claims, 12 Drawing Sheets

(56) References Cited

U.S. PATENT DOCUMENTS

2011/0188378 A1\* 8/2011 Collins ................ H04L 41/042
370/236
2014/0177461 A1\* 6/2014 Seyedmehdi ......... H04L 1/1887
370/252

OTHER PUBLICATIONS

Tai, A.T. et al: "Cluster-Based Failure Detection Service for Large-Scale Ad Hoc Wireless Network Applications"; 10 pages; Jun. 28, 2004.

\* cited by examiner

| Cluster Size N | Full Mesh Monitoring M = N | | | Two Level Monitoring M = ceil(√N) | | | Three-Level Monitoring M = ceil(∛N) | | |
|---|---|---|---|---|---|---|---|---|---|
| | Domain Size M | Links per Node N − 1 | Total Links N × (N − 1) | Domain Size M = √N | Links per Node (M−1) + (N/M−1) | Total Links ((M−1) + (N/M−1)) × N | Domain size M = ∛N | Links per node (M−1) + (M−1) + (N/M²−1) | Total Links ((M−1) + (M−1) + (N/M²−1)) × N |
| 16 | 16 | 15 | 240 | 4 | 6 | 96 | 3 | 5 | 80 |
| 27 | 27 | 26 | 702 | 6 | 9 | 243 | 3 | 6 | 162 |
| 64 | 64 | 63 | 4,032 | 8 | 14 | 896 | 4 | 9 | 576 |
| 125 | 125 | 124 | 15,500 | 12 | 21 | 2,625 | 5 | 12 | 1500 |
| 256 | 256 | 255 | 65,280 | 16 | 30 | 7,680 | 7 | 17 | 4,352 |
| 512 | 512 | 511 | 261,532 | 23 | 44 | 22,528 | 8 | 21 | 10,752 |
| 1000 | 1000 | 999 | 999,000 | 32 | 62 | 62,000 | 10 | 27 | 27,000 |

FIG. 9

NEIGHBOR MONITORING IN A HYPERSCALED ENVIRONMENT

TECHNICAL FIELD

Embodiments of the disclosure relate generally to systems and methods for monitoring a network of nodes.

BACKGROUND

Various network monitoring techniques have been developed for a network to supervise the state of its nodes and connections, such that problems caused by crashed or otherwise unresponsive nodes can be detected immediately. A common monitoring method is for the nodes to send out probes or heartbeats to other nodes in the network. The number of actively monitored links between the nodes, and thereby the amount of supervision traffic, increases as the number of nodes increases.

Some conventional systems use a full-mesh monitoring pattern, in which every node actively monitors every other node. For example, the Transparent Inter-Process Communication (TIPC) protocol links are established via a broadcast-based neighbor discovery protocol in a full-mesh pattern, whenever possible. In these systems, links are supervised individually, using a heartbeat or probing protocol that becomes active as soon as there is no traffic on a link.

The number of links for a full-mesh pattern, and thereby the amount of supervision traffic, increases with the number of nodes at a rate of $N \times (N-1)$, where N is the total number of nodes in the network (also referred to as the cluster size). This full-mesh monitoring scheme has worked well with the conventional cluster sizes of tens of nodes. However, the background monitoring load caused by the full-mesh monitoring scheme becomes unacceptable when the cluster sizes reach hundreds, or even thousands of nodes. One solution for reducing the background monitoring load is to increase the link tolerance; that is, decreasing the heartbeat frequency. But decreasing the heartbeat frequency severely degrades the behavior of TIPC, which normally is expected to detect and report link or peer node failure within 1.5 seconds of the failure event.

Another conventional monitoring scheme arranges the nodes in a ring pattern, and each node monitors the two neighbors immediately before and after itself in the ring. The monitoring traffic in a ring network increases linearly with the cluster size N. However, if the network is partitioned into two halves and one partition fails, the ring monitoring scheme can at most detect the failure of the nodes at the partition boundaries, but not the nodes in the interior of the partition. There are some other existing monitoring schemes, but each has its own inherent drawbacks.

Therefore, a solution is needed for a node monitoring scheme that combines the expected link supervision behavior in terms of detection time with an acceptable background load caused by the supervision.

SUMMARY

In one embodiment, a method is provided for monitoring a network of N nodes. The method is performed by each node of the N nodes. The method comprises: partitioning the N nodes into a plurality of domains according to a sorted order, wherein the domains include a local domain in which the node is located and one or more remote domains, each remote domain having a domain head designated to monitor member nodes in the remote domain; sending probes at a given frequency to actively monitored nodes that include all other member nodes in the local domain and domain heads in the remote domains; and determining whether each of the actively monitored nodes is up based on replies received from the actively monitored nodes in response to the probes.

In another embodiment, there is provided a node in a network of N nodes, the node adapted to monitor the N nodes collaboratively with the N nodes. The node comprises a circuitry adapted to cause the node to: partition the N nodes into a plurality of domains according to a sorted order, wherein the domains include a local domain in which the node is located and one or more remote domains, each remote domain having a domain head designated to monitor member nodes in the remote domain; send probes at a given frequency to actively monitored nodes that include all other member nodes in the local domain and domain heads in the remote domains; and determine whether each of the actively monitored nodes is up based on replies received from the actively monitored nodes in response to the probes.

In yet another embodiment, there is provided a node in a network of N nodes, the node adapted to monitor the N nodes collaboratively with the N nodes. The node comprises: a partition module adapted to partition the N nodes into a plurality of domains according to a sorted order, wherein the domains include a local domain in which the node is located and one or more remote domains, each remote domain having a domain head designated to monitor member nodes in the remote domain; a probe module adapted to send probes at a given frequency to actively monitored nodes that include all other member nodes in the local domain and domain heads in the remote domains; and a determination module adapted to determine whether each of the actively monitored nodes is up based on replies received from the actively monitored nodes in response to the probes.

In another embodiment there is provided a method for monitoring a network of N nodes. The method comprises: initiating an instantiation of a node instance in a cloud computing environment which provides processing circuitry and memory for miming the node instance. The node instance is operative to partition the N nodes into a plurality of domains according to a sorted order, wherein the domains include a local domain in which the node is located and one or more remote domains, each remote domain having a domain head designated to monitor member nodes in the remote domain; send probes at a given frequency to actively monitored nodes that include all other member nodes in the local domain and domain heads in the remote domains; and determine whether each of the actively monitored nodes is up based on replies received from the actively monitored nodes in response to the probes.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

FIG. 9 is a table comparing full-mesh monitoring, two-level monitoring and three-level monitoring according to one embodiment.

DETAILED DESCRIPTION

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

Systems, apparatuses and methods for monitoring nodes in a network according to a hyperscaled scheme are provided herein. The hyperscaled scheme combines fast detection time with an acceptable background load caused by the supervision; that is, the background load scales moderately when the cluster size increases. For each node in the network, all the other nodes are its neighbors as every node may be connected to all the other nodes. However, not all of these connections are actively monitored according to the hyperscaled scheme. A "node," as used herein, may be a physical node or a virtual node. Multiple virtual nodes may be collocated on the same physical host. In one embodiment, each node in the network sorts all nodes in its network view into an ordered list using the same sorting algorithm as all the other nodes in the network. According to the sorted order, each node partitions the nodes into multiple domains for supervision. The supervision is hierarchical in that each node actively monitors its own domain (a.k.a. local domain), and designates a number of domain heads to monitor remote domains. It is noted that the terms "local" and "remote" refer to a logical distance in the sorted list between nodes, and do not indicate the physical distance between the nodes. Each node maintains a domain record of the member nodes in its local domain. The domain record records the node's knowledge about its local domain with respect to the identity of the member nodes in the local domain; more specifically, with respect to the total number and the identifiers (e.g., addresses) of these member nodes. In one embodiment, each node actively monitors its local domain members and the domain heads by sending probes or heartbeats to these nodes. For each node, the term "actively monitored nodes" for that node refers to all other member nodes in the node's local domain and the domain heads designated by the node in the node's remote domains, that are being monitored by that node. A response to a probe indicates that the probe recipient is up (i.e., operational); otherwise, the probe recipient is down (i.e., non-operational).

According to the hyperscaled scheme, each node maintains its own network view; that is, its knowledge about the network with respect to the total number of nodes in the network and identifiers (e.g., addresses) of the nodes in the network. As the network views of the nodes in the network are uncoordinated, different nodes may maintain different network views.

Figure 1C:
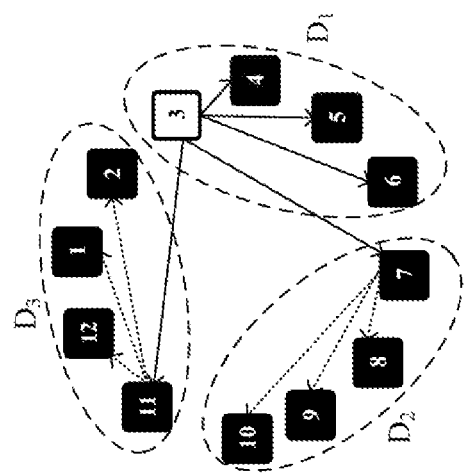
FIGS. 1A, 1B and 1C illustrate example network views of three different nodes according to one embodiment.
Figure 1B:
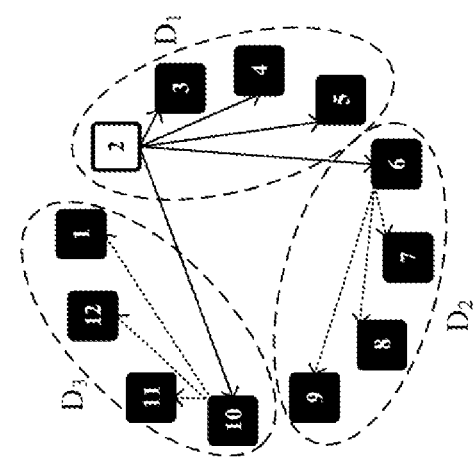
Figure 1A:
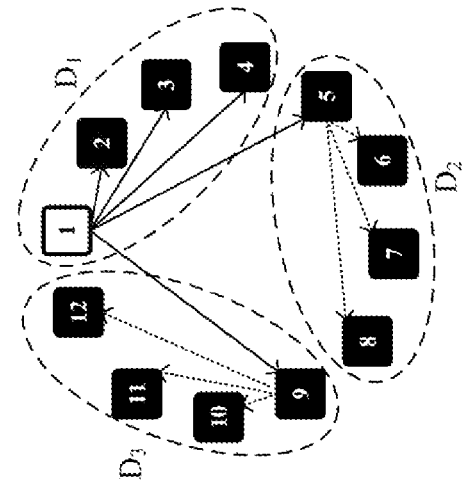

FIGS. 1A-1C illustrate examples of a hyperscaled domain monitoring scheme according to one embodiment. FIG. 1A illustrates the network view of Node_1. There are a total of N=12 nodes in Node_1's network view. Node_1 sorts the twelve nodes into an ordered list. For example, the twelve nodes are sorted in an ascending numerical order starting with Node_1 being the number one node in the ordered list. All of the twelve nodes perform sorting operations using the same sorting algorithm on the same set of representations (e.g., numerical representations) of the nodes. The numerical representation for any node in the network may be the node's numerical identifier (such as the network address), a hash value of the numerical identifier, or a mapped value of the numerical identifier. In some embodiments, the sorting may be performed on alpha-numerical or non-numerical representations of the nodes. If the hash values or the mapped values are used for sorting, all of the nodes use the same hash algorithm or the same mapping function. After the sorting, the ordered list is further arranged into a circular list, where the last node in the ordered list is ordered immediately before the first node in the ordered list. The twelve nodes are then partitioned into a number of domains, including a local domain and one or more remote domains.

In One Embodiment, Node_1 Calculates the Local Domain Size M from N According to a Pre-Determined Formula; e.g., the Ceiling of $$(\sqrt[2]{N}).$$

In all alternative embodiment, the domain size M may be configurable or calculated by another formula. All of the nodes in the network calculate the domain size using the same formula.

In the example of N=12, $$M = \mathrm{ceil}(\sqrt[2]{N}) = 4.$$

Thus, the local domain size for Node_1 is 4. The nodes that are outside the local domain form one or more remote domains. In the example of FIG. 1A, the local domain ($D_1$) of Node_1 includes Node_1, Node_2, Node_3 and Node_4, which are referred to as the member nodes of the local domain $D_1$. The remote domain ($D_2$) includes Node_5, Node_6, Node_7 and Node_8, and the remote domain ($D_3$) includes Node_9, Node_10, Node_11 and Node_12. One node in each remote domain is designated as the domain head, e.g., the first node of that domain. In the example of FIG. 1A, Node_5 is the domain head of $D_2$, and Node_9 is the domain head of $D_3$. Node_1 relies on the domain heads to monitor the nodes in the remote domains. Thus, the N nodes collaboratively monitor all N nodes even though each node only actively monitors a subset of the N nodes. Further details about the formation of the domains will be described later with reference to FIG. 3.

As indicated by the solid arrows in FIG. 1A, Node_1 actively monitors the domain heads (e.g., Node_5 and Node_9) as well as all the other member nodes (e.g., Node_2, Node_3 and Node_4) in its local domain. The nodes that are actively monitored by Node_1 receive probes from Node_1 at a predetermined frequency. The predetermined frequency or its inverse (referred to as the probe interval) may be a configurable value. For example, the probe interval may be a number of seconds, milliseconds, or microseconds, such as 375 milliseconds. When an actively monitored node responds to the probe, the response confirms that the actively monitored node is up. If Node_1 does not receive a response from an actively monitored node, it is an indication to Node_1 that the actively monitored node is down. The nodes monitored by the domain heads in remote domains receive probes from their domain heads, as indicated by dotted arrows in FIG. 1A.

Each node in the network performs the same monitoring operations as Node_1. FIG. 1B illustrates the network view of Node_2, which by performing the same sorting algorithm as Node_1, sorts the twelve nodes into an ordered list. Node_2 also calculates the local domain size M, and according to M, forms a local domain and then partitions the rest of the nodes into remote domains. FIG. 1B shows that Node_2's local domain ($D_1$) includes Node_2, Node_3, Node_4 and Node_5, a remote domain ($D_2$) includes Node_6, Node_7, Node_8 and Node_9, and another remote domain ($D_3$) includes Node_10, Node_11, Node_12 and Node_1. One node in each remote domain is designated as the domain head. In the example of FIG. 1B, Node_6 is the domain head of $D_2$, and Node_10 is the domain head of $D_3$. Node_2 relies on the domain heads to monitor the nodes in the remote domains. Similar to Node_1, Node_2 actively monitors the domain heads (e.g., Node_6 and Node_10) as well as all the other member nodes (e.g., Node_3, Node_4 and Node_5) in its local domain. By sending probes to these nodes, Node_2 is able to determine whether each of these nodes is up or down.

FIG. 1C illustrates the network view of Node_3, which performs the same sorting, domain size determination, domain partition and domain head designation as Node_1 and Node_2. The three domains for Node_3 are: the local domain ($D_1$) including Node_3, Node_4, Node_5 and Node_6; a remote domain ($D_2$) including Node_7, Node_8, Node_9 and Node_10, with Node_7 being the domain head; and another remote domain ($D_3$) including Node_11, Node_12, Node_1 and Node_2, with Node_11 being the domain head. Node_3 relies on the domain heads to monitor the nodes in the remote domains. Similar to Node_1 and Node_2, Node_3 actively monitors both domain heads (e.g., Node_7 and Node_11) as well as all the other member nodes (e.g., Node_4, Node_5 and Node_6) in its local domain. By sending probes to these nodes, Node_3 is able to determine whether each of these nodes is up or down.

Thus, each node in the network has a local domain and one or more remote domains. Each node may be designated as a domain head by some other nodes, but it does not know and does not need to know which nodes have designated it as a domain head.

Although N is divisible by M in the examples of FIGS. 1A-1C, in general N can be any integer number that is not necessarily divisible by M. The local domain includes M nodes. However, the remote domains may include any number of nodes, some may be fewer and some may be greater than M. Further details will be provided later with reference to FIG. 3.

Figures 2A, 2B:
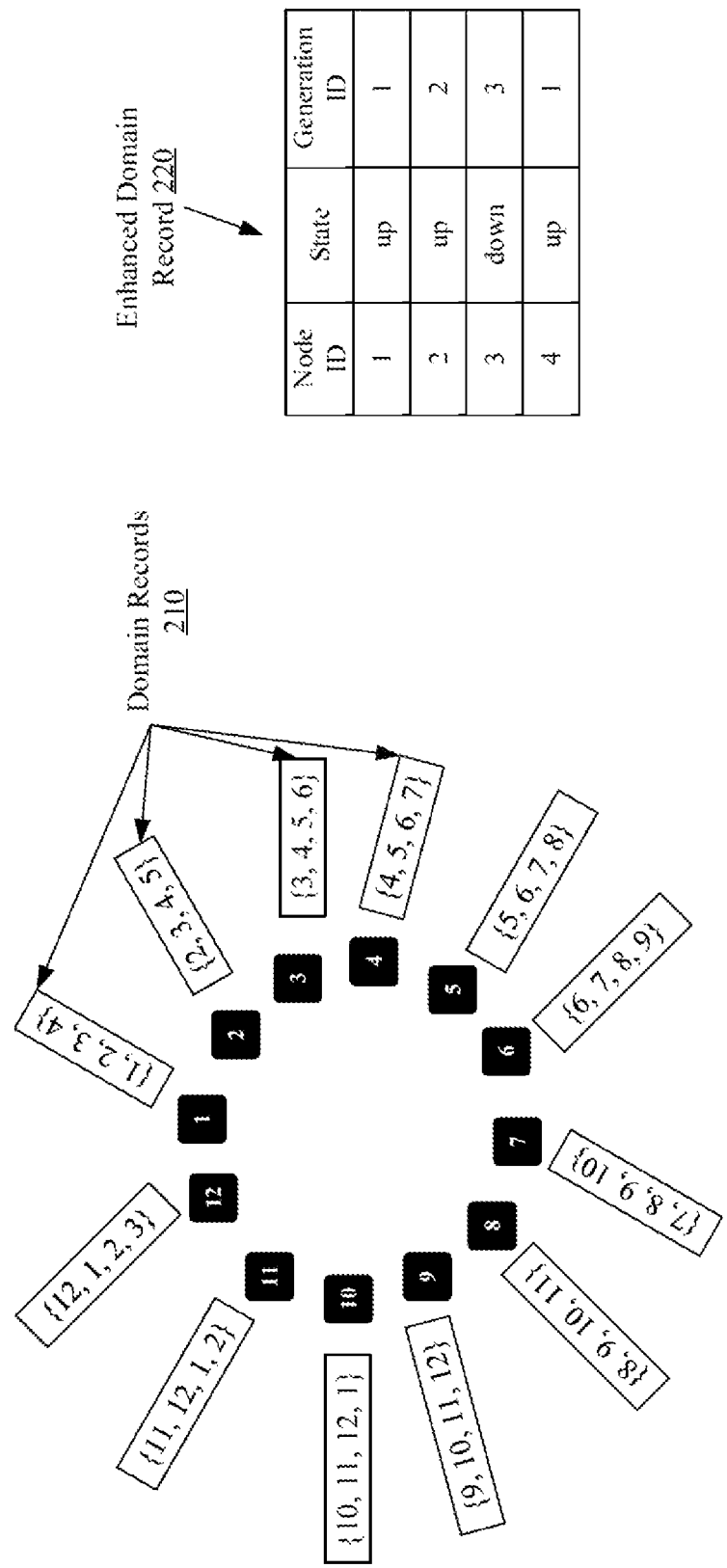
FIG. 2A illustrates examples of domain records according to one embodiment.
FIG. 2B illustrates an example of an enhanced domain record according to one embodiment.

FIG. 2A illustrates examples of domain records 210 according to one embodiment. In this example, it is assumed that all nodes in the network have the same network view with N=12 and M=4. Each node maintains and stores a domain record 210 of its local domain in its local memory. Each domain record 210, as shown in the rectangular block next to each node, contains the identifiers of all member nodes of its local domain. Alternatively, the domain record 210 may include the identifiers of all member nodes in the local domain excluding itself. In another embodiment, the domain record 210 of each node may store the up/down state in addition to the identifiers of all member nodes of the node's local domain. The nodes in each domain record 210 are ordered according to the ordered list sorted by the node that maintains the domain record 210.

FIG. 2B illustrates an example of an enhanced domain record 220 according to an alternative embodiment. The enhanced domain record 220 contains, for each member node in its local domain, the node identifier, its up/down state and a generation identifier. The generation identifier increments each time its corresponding node's local domain changes (e.g., node up/down or node addition/removal). In one embodiment, the generation identifier is a stepping number; in another embodiment, the generation identifier is a round-stepping number which resets to zero when its value reaches the maximum. In one embodiment, the generation identifier may be implemented by a 16-bit integer. The example of the enhanced domain record 220 in FIG. 2B is maintained by and stored at Node_1. Although not shown in FIG. 2B, each node in the network may maintain and store an enhanced domain record of its local domain according to this alternative embodiment.

The use of the generation identifiers has at least two purposes. The first purpose is to optimize domain updates. The node receiving an enhanced domain record can quickly determine whether anything has changed regarding the sender's local domain; that is, whether or not the receiver node needs to go through a full re-assignment of domain heads and/or recalculation of its sorted list of nodes, which can be a heavy operation. The second purpose is to keep up with other node's domain updates. In one embodiment, after a node is connected to the network, the node will receive enhanced domain records only from its domain heads. Thus, there is a risk that the node's view of a non-domain-head's local domain may fall behind (i.e., become outdated). By letting a domain head transmit the generation identifiers of all member nodes (including itself) of its local domain, the receiver node may know whether it has fallen behind for any of these member nodes. If it has fallen behind, the receiver node issues a confirmation probe to that node, and obtains its up-to-date domain record in return.

As will be described in further detail below, the transmission of the domain records of FIG. 2A is event-driven; that is, they are sent when a domain event occurs such as node up/down or node addition/removal. In contrast, the transmission of the enhanced domain records of FIG. 2B is time-driven; that is, they are sent as part of the periodic probes and probe replies, whether or not there is a domain event. In one embodiment, the enhanced domain record of a sender node is attached to all probes and probe replies that it sends.

Figure 3:
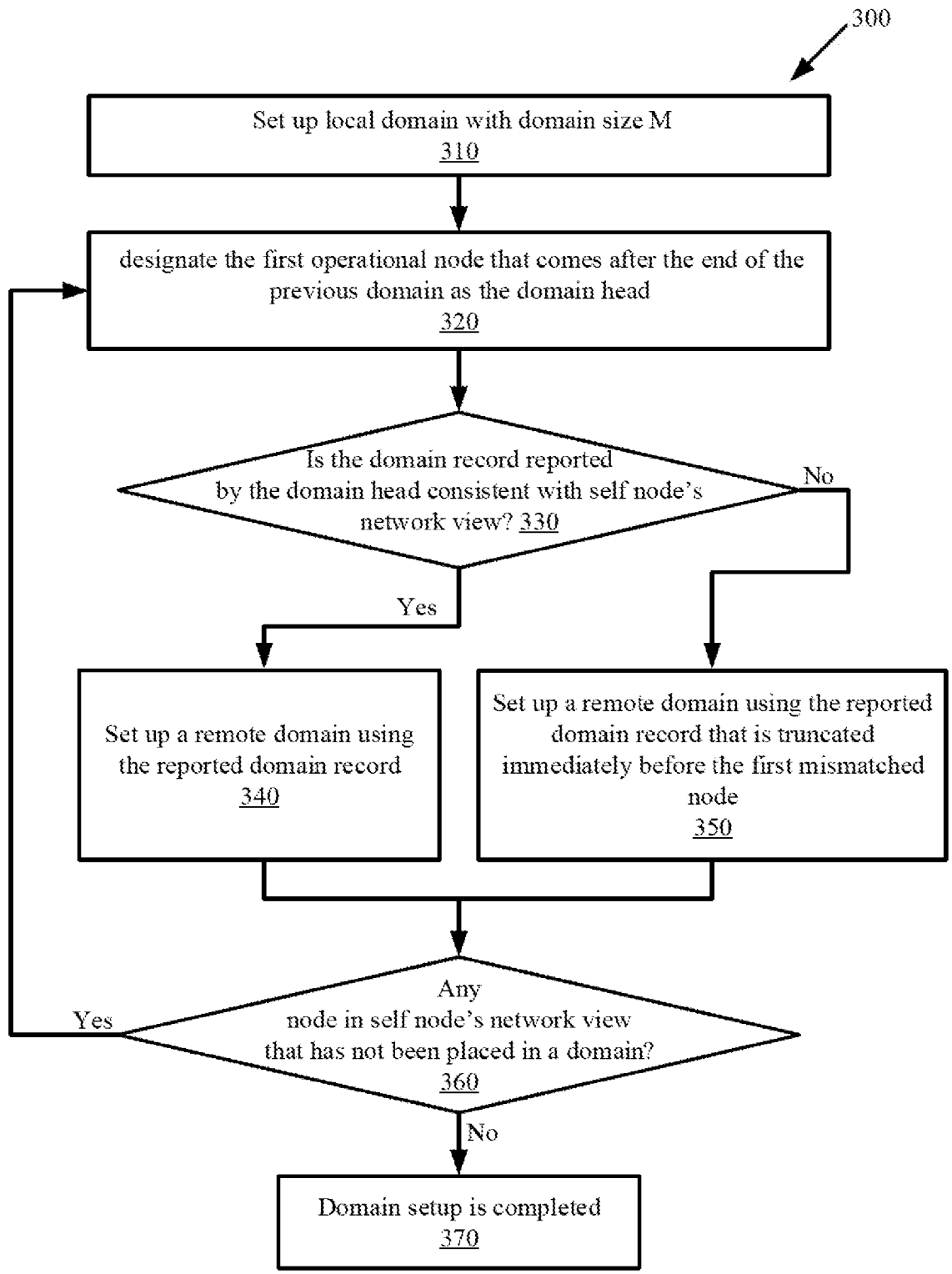
FIG. 3 is a flow diagram illustrating a method for partitioning nodes in a network into a plurality of domains according to one embodiment.

FIG. 3 is a flow diagram illustrating a method 300 for partitioning the nodes in a network into a plurality of domains according to one embodiment. The method 300 is performed by each node in the network. For clarity, the method 300 is described from the viewpoint of the node (referred to as the "self node") performing the method 300. The method begins with the self node setting up its local domain at step 310. The local domain starts with the self node and the (M−1) nodes following the self node in self node's ordered list. At step 320, the self node designates a domain head, which is the first operational node that comes after the end of the local domain nodes in the ordered list. Referring to the example of FIG. 1A where Node_1 is the self node, Node_5 is designated as a domain head if Node_5 is up. If Node_5 is down, Node_1 will designate the next operational node (e.g., Node_6) as a domain head and apply Node_6's reported domain record as the remote domain, as will be described in the following steps of the method 300. When Node_5 comes up, Node_1 will re-designate Node_5 as the new domain head and apply Node_5's reported domain record as the new remote domain.

It is noted that the domain records of all other nodes in the network have been previously reported to the self node. Thus, regardless which node is designated as the domain head, the self node is able to apply the corresponding domain record to set up a remote domain. The reported domain record identifies the member nodes in the domain head's local domain. Normally, the self node's local domain and the domain head's local domain are of the same size (M), since the size is normally computed from the same N using the same formula. However, in some scenarios, the self node and the domain head may have different network views; that is, they may see different number of nodes in the network. At step 330, the self node determines whether the reported domain record is consistent with its network view; that is, the domain record does not contain any excess nodes (i.e., nodes that are not in self node's network view) or any missing nodes (i.e., nodes that are in the self node's ordered list but are missing in the reported domain record). The self node makes the determination by comparing the nodes in its ordered list with the nodes in the reported domain record, starting with the domain head designated at step 320 and then each node following that domain head according to the sorted order. The comparison stops at the first inconsistency or at the self node (if the reported domain record contains the self node), whichever comes first.

If the reported domain record is consistent with the self node's network view, at step 340, the self node sets up a remote domain including all nodes in the reported domain record. If the reported domain record contains the self node, the remote domain stops immediately before the self node. The remote domain is monitored by the corresponding domain head.

If the reported domain record is inconsistent with the self node's network view, at step 350, the self node sets up a remote domain using the reported domain record that is truncated immediately before the first mismatched node. Examples of domain truncation are provided in FIGS. 4A and 4B, which will be described later.

At step 360, if there are more nodes in the self node's network view that have not been placed in a domain, the method 300 returns to step 320, where the next operational node that comes after the end of the previous domain is designated as a domain head. The method 300 continues until all nodes in its network view are placed in domains and terminates at step 370.

Figure 4B:
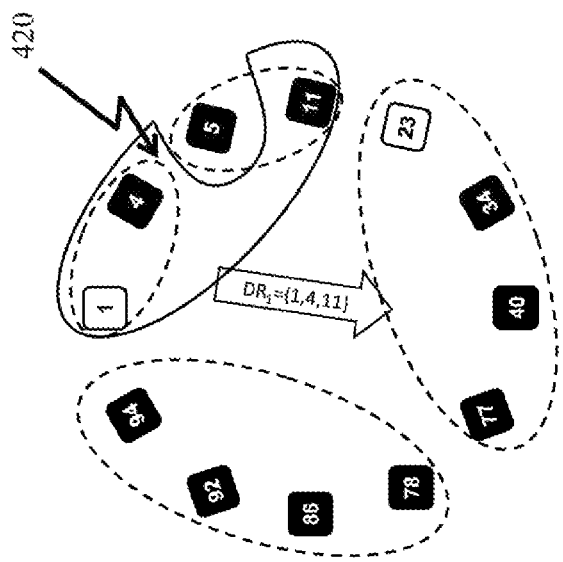
FIGS. 4A and 4B illustrate two examples in which two nodes have different network views according to one embodiment.
Figure 4A:
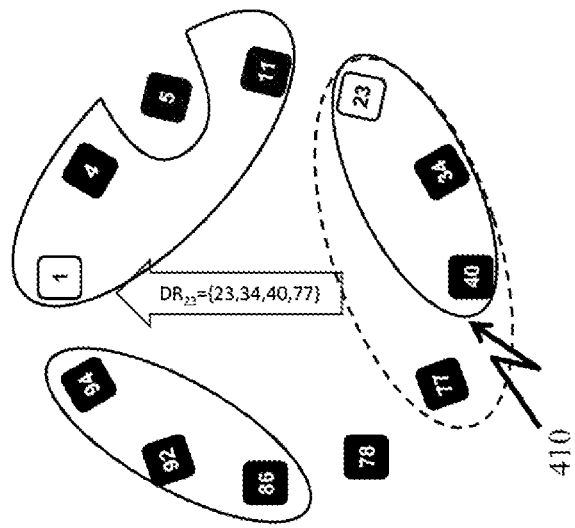

FIG. 4A illustrates an example in which the domain record received by the self node has excess nodes according to one embodiment. In this example, the nodes are sorted in an ascending and non-consecutive order, as indicated by the numbers shown on the nodes. The self node in this example is Node_1, which has a network view of $N_1=9$ and $M_1=3$. Node_5, Node_77 and Node_78, which are in Node_23's network view, are invisible to Node_1 (i.e., not in Node_1's network view). One most common reason for Node_1 not seeing these nodes is that Node_1 may have started later (e.g., a fraction of a second) than Node_23, and hence had no time to detect these three nodes yet. Another reason may be network or switch problems, which inhibit detection between Node_1 and the three nodes. Yet another reason may be network configurations. For example, the network may be configured to include two Virtual Local Area Networks (VLANs) or subnets, in which all nodes except Node_5, Node_77 and Node_78 are connected to one, and all nodes except Node_1 is connected to the other. Another reason may be that the network is not set up as a full mesh network. For example, the network may be set up as a star or a dual-star network.

Node_1 first sets up its local domain that includes three nodes: Node_1, Node_4 and Node_11. In Node_1's network view, the node following Node_11 is Node_23. Node_1 designates Node_23 as a domain head, assuming that Node_23 is operational. Node_23 has a network view of $N_{23}=12$ and $M_{23}=4$. The domain record of Node_23 is $DR_{23}=\{Node\_23, Node\_34, Node\_40, Node\_77\}$, and has been reported to Node_1. After setting up the local domain, Node_1 compares $DR_{23}$ with its ordered list, and identifies Node_77 as the first mismatched node (which is not in Node_1's network view). Thus, Node_1 uses $DR_{23}$ to set up the remote domain, but truncates the list of nodes at 410, which is immediately before the first mismatched node, Node_77. As a result, the remote domain includes {Node_23, Node_34, Node_40} with Node_23 being the domain head. Similarly, Node_1 may designate the next operational node (e.g., Node_86) as the domain head for the next remote domain, and set up the next remote domain as {Node_86, Node_92, Node_94}. The domains of Node_1 are encircled in solid outlines, and the local domain of Node_23 is encircled in dashed outlines. The domain record ($DR_{23}$) that Node_1 received from Node_23 is kept in Node_1 for later matching purposes; e.g., when there is a change to Node_1's network view such as a node addition or a node removal.

If, in FIG. 4A, another node (e.g., Node_86) instead of Node_77 is invisible to Node_1, then $DR_{23}$ would be consistent with Node_1's network view. In this case, Node_1 uses $DR_{23}$ to set up the remote domain as {Node_23, Node_34, Node_40, Node_77} with Node_23 being the domain head. Thus, in this case, the size of this remote domain is equal to four, which is greater than $M_1=3$. The next remote domain would be {Node_92, Node_94} with Node_92 being the domain head.

FIG. 4B illustrates an example in which the domain record received by the self node has a missing node according to one embodiment. In this example, the self node is Node_23. All of the nodes shown in FIG. 4B are in Node_23's network view. According to the local domain size $M_{23}=4$, Node_23 first sets up its local domain including four nodes {Node_23, Node_34, Node_40, Node_77}. Node_23 designates Node_78 as the domain head for the first remote domain that includes {Node_78, Node_86, Node_92, Node_94}. Node_23 then designates Node_1 as the next domain head, and sets up the second remote domain based on Node_1's domain record $DR_1$={Node_1, Node_4, Node_11}. The first mismatched node between $DR_1$ and Node_23's network view is Node_5, which is missing from $DR_1$. Thus, Node_23 truncates the nodes in $DR_1$ immediately before the missing Node_5 to form the second remote domain, which includes {Node_1, Node_4}. The remaining nodes {Node_5, Node_11} form the third remote domain. The domains of Node_23 are encircled in dashed outlines, and the local domain of Node_1 is encircled in solid outlines. The domain record ($DR_1$) that Node_23 received from Node_1 is kept in Node_23 for later matching purposes; e.g., when there is a change to Node_23's network view such as a node addition or a node removal.

The scenarios of excess nodes and missing nodes described in FIG. 4A and FIG. 4B, as viewed from different nodes, are normally transitional. However, even if the different network views are permanent, the aforementioned operations still work for the purpose of monitoring the nodes in the network.

In an alternative embodiment, the "domain record" mentioned above in connection with FIG. 3, FIG. 4A and FIG. 4B may be replaced by the "enhanced domain record." Thus, a "reported domain record" may be a domain record, such as the example illustrated in FIG. 2A, that is reported by one node to another node. Alternatively, a "reported domain record" may be an enhanced domain record, such as the example illustrated in FIG. 2B, that is reported by one node to another node. The aforementioned operations of partitioning nodes to form domains can be performed in the same manner when either "domain record" or "enhanced domain record" is used.

Figure 5C:
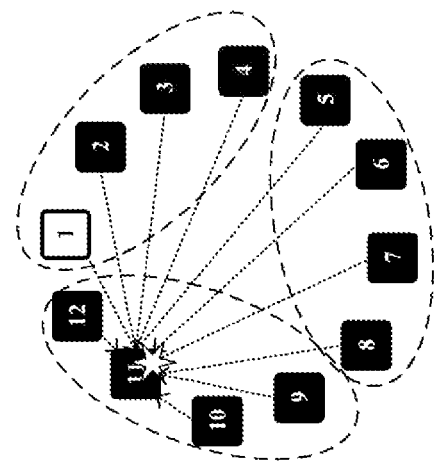
FIG. 5C illustrates the responses to a domain event according to one embodiment.
Figure 5B:
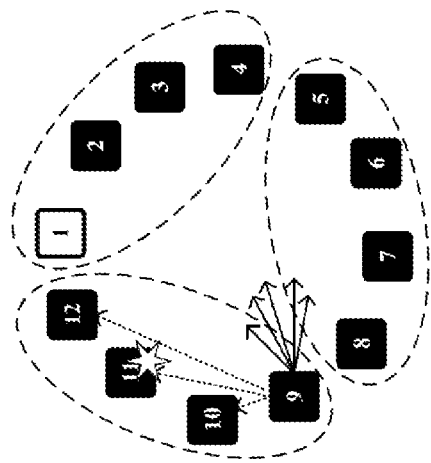
FIG. 5B illustrates an example domain event according to one embodiment.
Figure 5A:
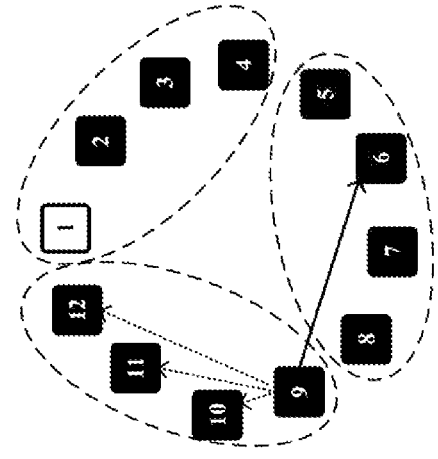
FIG. 5A illustrates a scenario in which a new node is added to the network according to one embodiment.

FIG. 5A illustrates a scenario in which a new node is added to the network according to one embodiment. When a new node (e.g., Node_6) is added to the network, all of the previously existing nodes may discover the new node via a neighbor discovery mechanism and establish links to the new node. From the description in connection with FIGS. 1A-1C, it is understood that not all of these links are, or will be, actively monitored. When a node (e.g., Node_9) detects the presence of Node_6 in the network and establishes a link to it, Node_9 sends its domain record or enhanced domain record to Node_6 via the established link; e.g., via unicast. By sending the domain record or enhanced domain record, Node_9 communicates to Node_6 that Node_9 is the domain head of all the member nodes in the domain described in that domain record. Similarly, all of the other nodes in the network also send their domain records or enhanced domain records to Node_6, such that Node_6 can set up its network view according to the received information. The addition of the new node to the network changes the total number of nodes (N) in the network. Thus, upon detecting a new node, each of the existing nodes re-sorts its list of nodes and re-calculates the domain size (M) to make an adjustment, if necessary, to the membership of its local domain, the membership of its remote domains and/or the domain heads in the remote domains. The new node may belong to the local domain or any of the remote domains.

FIG. 5B illustrates an example domain event according to one embodiment. When a node (e.g., Node_9) detects that a change occurs to one of its member nodes in its local domain, the node broadcasts the change as a domain event to all other nodes in the network. The change may be node addition, node removal or node down. In the case of a node addition or node removal event, Node_9 may broadcast its updated domain record to all other nodes in the network, after updating the domain view in response to the node addition or node removal. In the case of a node up or node down event, Node_9 may broadcast only the identity (e.g., an identifier) of the up/downed node. In the example of FIG. 5B, Node_9 broadcasts to all other nodes in the network that Node_11 is down.

FIG. 5C illustrates the responses to a domain event according to one embodiment. Each node is prepared to receive domain events from other nodes in the network. When a node receives a node down event about a given node (e.g., Node_11) being down, the node sends one or more confirmation probes to that given node to confirm that the given node is down. This is because even though Node_X cannot communicate with Node_Y, it does not mean that Node_Z also cannot communicate with Node_Y. In one embodiment, the number of confirmation probes to be sent may be a predetermined number. The sending of the confirmation probes continues until the sender node receives a response from the given node, or until it receives a second node down event from another source regarding the same given node being down. For example, the first node down event may be from Node_9, announcing that Node_11 is down, and the second node down event may be from Node_10, also announcing that N_11 is down. At the receipt of the second node down event, the sending node stops probing and takes down the link to the given node unconditionally (i.e., without waiting further for the confirmation probing to confirm (or not) that the node is down). The sender node may also stop probing and take down the link to the given node unconditionally after it sends the predetermined number of confirmation probes, and no response is received from the given node. As shown in the example of FIG. 5C, all of the eleven nodes that are up in the network send confirmation probes to Node_11 upon receiving the node down event from Node_9.

When a node goes down, its state changes from up to down but it is still present in the network. However, a down node cannot serve as a domain head to monitor other nodes. Thus, when a node detects that one of its domain heads is down, the node initiates confirmation probing of all member nodes in that remote domain. For example, since Node_3 has designated Node_11 as a domain head for $D_3$ (FIG. 1C), Node_3 sends confirmation probes to Node_12, Node_1 and Node_2 when it determines that Node_11 is down. If one or more of these member nodes in $D_3$ are up, then Node_3 moves the domain head of $D_3$ to the next node in $D_3$ that is up (e.g., Node_12). When Node_11 becomes up again, Node_3 may move its domain head of $D_3$ back to Node_11.

Another example of a domain event is a node up event. Referring again to FIG. 5B, when Node_9 detects that Node_11 is up, Node_9 broadcasts to all other nodes in the network that Node_11 is up. Although the "node up" may be discovered by other nodes using some other mechanisms, in some cases when a node changes its state from down to up, it may have working connections to only some, but not all, of the other nodes in the network. For example, Node_1 may have a working connection with Node_11 and know about Node_11 being up, but Node_9 may fail to establish a working connection with Node_11. But if a node up event is reported by Node_9, it indicates that Node_9 has a working connection with Node_11. Thus, Node_1 can rely on its domain head Node_9 to update the state of Node_11.

As mentioned before, a domain event may be broadcast to all nodes in the network when a node is up, down, added or removed. The "up" or "down" state of a node is a state change, and does not affect the total number of nodes present in the network. Thus, when a node changes its up/down state, other nodes in the network do not re-sort the nodes and do not re-calculate the local domain size. However, the change of a node's up/down state may affect the domain head assignment and remote domain membership; e.g., when the node that has the up/down state changed is or was a domain head. Thus, each node needs to determine whether to reassign domain heads and/or change remote domains. When a node is added or removed, the total number of nodes in the network changes. Thus, each node re-sorts the nodes and re-calculates the domain size when a "node addition" or "node removal" event occurs. Each node may also re-designate one or more of its domain heads, because a current domain head may be removed or the boundaries of the domains may be changed.

It is noted that the operations described above in connection with FIG. 5B and FIG. 5C are specific to the use of domain records. In an embodiment where enhanced domain records are used, the node up/down and node addition/removal events are reported when probes and probe replies are exchanged among nodes via unicast. A sender node attaches its enhanced domain record to every probe and probe reply that it sends. Thus, a probe or a probe reply may include any number (zero to any positive integer) of domain events.

FIGS. 6A-6D illustrate an example in which two sets of probes are sent from each node according to one embodiment. The first set of probes from the self node are sent to all of the actively monitored nodes. Using Node_1 as an example, Node_1 sends the first set of probes, indicated by solid lines, to all of its actively monitored nodes (e.g., Node_2, Node_3, Node_4, Node_5 and Node_9) at a first frequency. The first frequency is the predetermined frequency mentioned above in connection with FIG. 1A.

The second set of probes are sent from the self node to all nodes in the remote domains except the domain heads. The recipients of the second set of probes are also referred to as the "non-domain-head nodes." It is noted that although each node only actively monitors a subset of the N nodes in the network (five nodes in this example), each node may have connections to more than five nodes. For example, in some embodiments each node may be connected to all of the other (N−1) nodes in the network, and may want to send traffic to any of these nodes via the corresponding connections. A node may rely on its domain head to report whether a non-domain-head node in the corresponding remote domain is up. However, connectivity may not be transitive; that is, even though a domain head (Node_X) can communicate with Node_Y, it does not mean that Node_Z can also communicate with Node_Y. Although such scenarios are highly unlikely in normal network operations, as a "last resort" failure discovery mechanism each node sends the second set of probes at a low frequency in order to discover a connection failure that is not detectable by the domain heads.

Figure 6A:
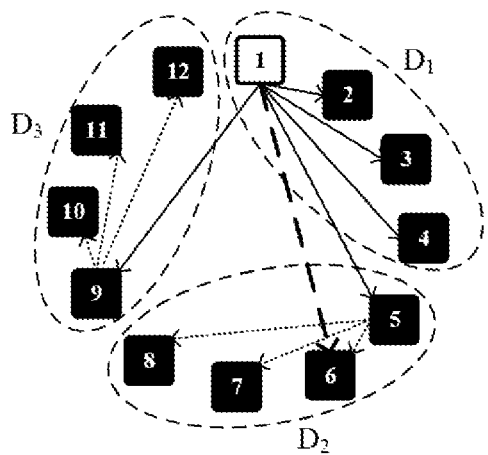
FIGS. 6A, 6B, 6C and 6D illustrate an example in which a node sends two sets of probes according to one embodiment.
Figure 6B:
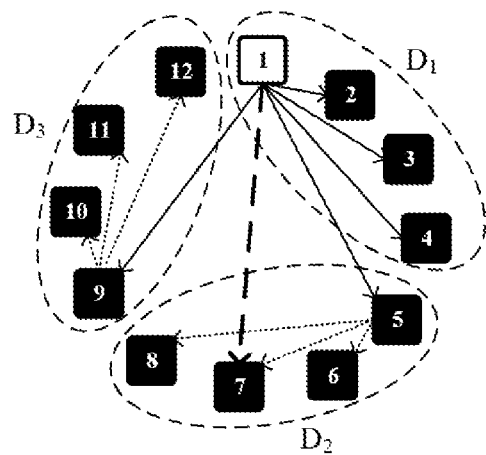
Figure 6C:
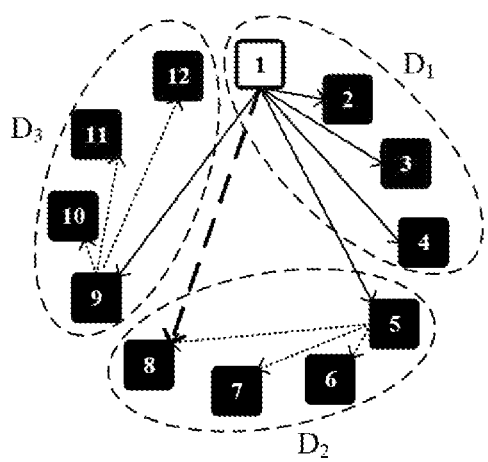
Figure 6D:
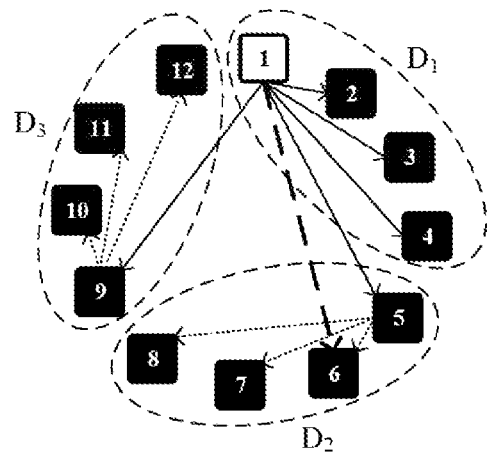

Referring to FIG. 6A, Node_1 relies on the domain head Node_5 to monitor the nodes in $D_2$. Although Node_5 can communicate with Node_6, there is no guarantee that Node_1 can also communicate with Node_6. Thus, Node_1 sends the second set of probes, indicated by dashed lines in FIGS. 6A-6D, to the non-domain-head nodes at a second frequency per node; that is, each of these nodes is probed at the second frequency. The second frequency is lower than the first frequency; e.g., two or three orders of magnitude lower, or any frequency that is sufficiently lower than the first frequency, in order to minimize the background monitoring load caused by this additional probing. The second set of probes may be sent to the non-domain head nodes in each remote domain in round-robin, or in other ways as known by a skilled person in the art. FIGS. 6A-6D show the round-robin probing of the non-domain-head nodes in $D_2$. The probing, as shown in a dashed line, starts from FIG. 6A, followed by FIG. 6B to FIG. 6C and to FIG. 6D, then repeats from FIG. 6B, and so on. The other non-domain-head nodes, e.g., Node_10, Node_11 and Node_12 in $D_3$, may be round-robin probed in parallel with the non-domain-head nodes in $D_2$. In an alternative embodiment, all of the non-domain-head nodes may be round-robin probed sequentially, one domain at a time. However, failure detection time for this alternative embodiment would be excessive for a large cluster size (e.g., when there are hundreds or thousands of nodes). In yet another embodiment, a node will learn about a connection problem when it sends traffic to another node and receives no acknowledgement.

Figure 7:
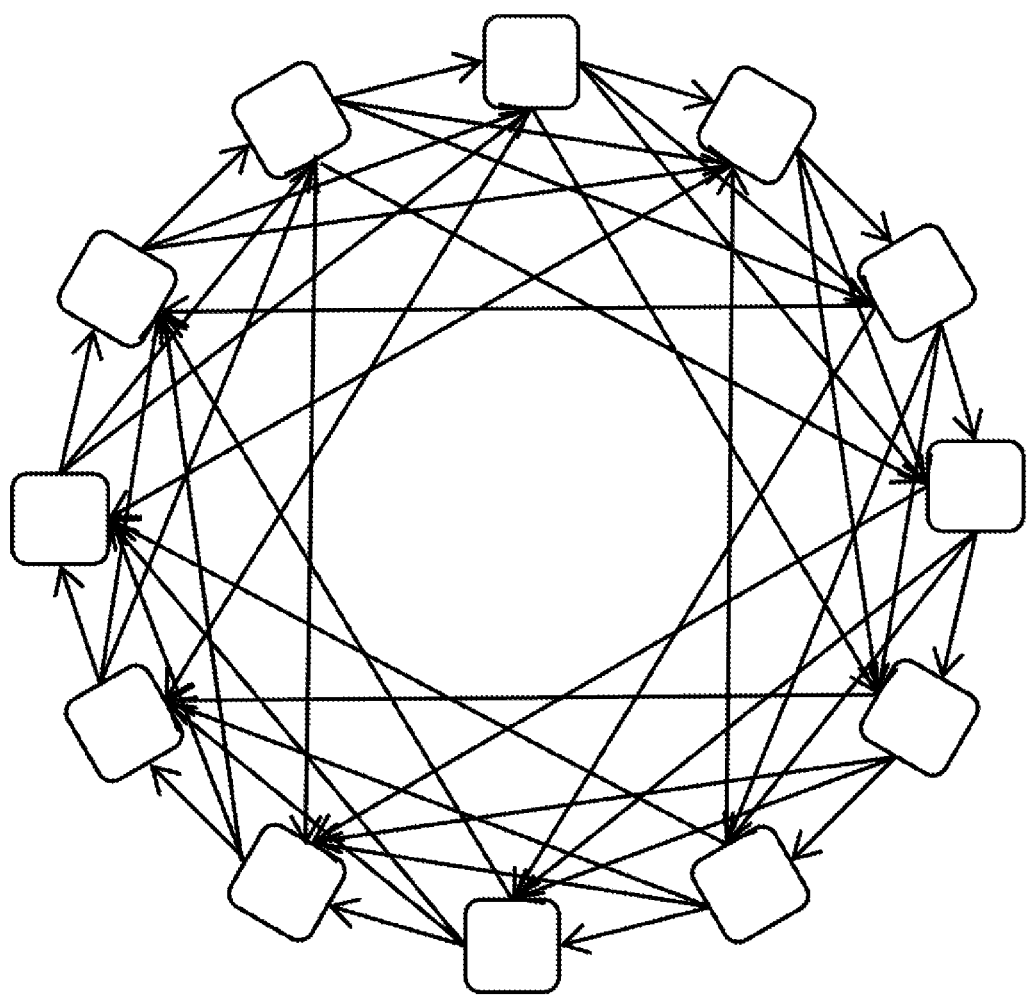
FIG. 7 illustrates the actively monitored links in a network of twelve nodes according to one embodiment.

FIG. 7 illustrates all of the actively monitored links in a network of N nodes (e.g., N=12) according to one embodiment. If the domain size M is equal to $$\text{ceil}(\sqrt[2]{N}),$$

the total number of actively monitored links in a network of N nodes is equal to $$T = N \times \left((M-1) + \left(\left(\frac{N}{M} - 1\right)\right)\right).$$

When N=12, T=60. In a conventional full-mesh monitoring scheme where every node actively monitors all other nodes, the total number of actively monitored links $T_{fm}=N\times(N-1)$. When N=12, $T_{fm}=132$, which is more than twice of T. Thus, a significant reduction in the background monitoring load has been achieved.

Figure 8:
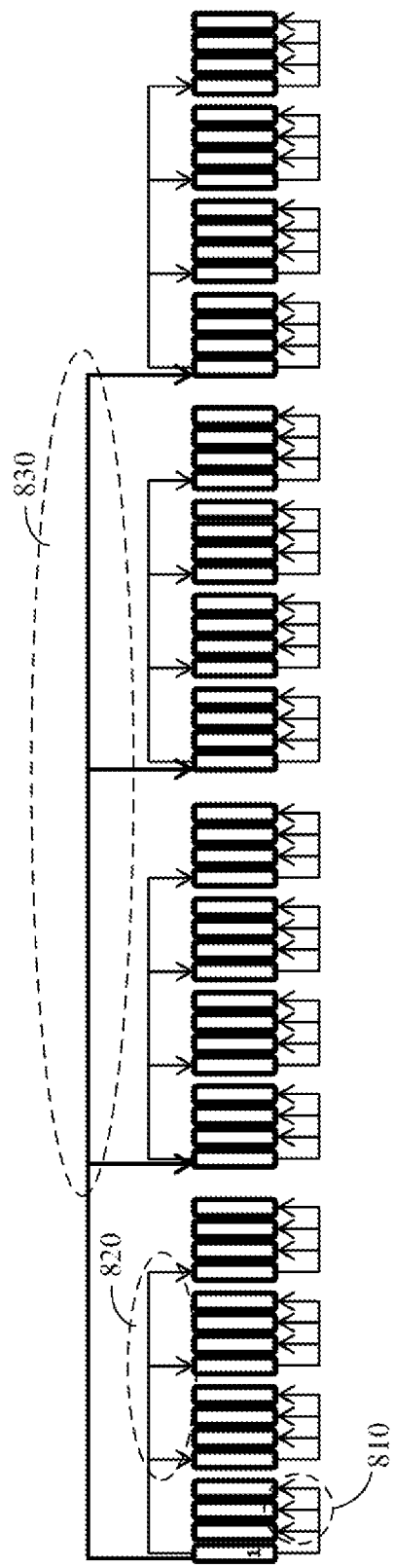
FIG. 8 illustrates a three-level hyperscaled monitoring scheme according to one embodiment.

FIG. 8 illustrates a three-level hyperscaled monitoring scheme according to one embodiment. In this example, N=64, $$M = \sqrt[3]{N} = 4.$$

In this example, the domains form a three-level hierarchy of the 64 nodes. Each first-level domain (e.g., the first four nodes on the far left) includes four nodes, each $2^{nd}$-level domain includes four first-level domains, and each $3^{rd}$-level includes four $2^{nd}$-level domains. For Node_1 (on the farthest left), it actively monitors three (M−1=3) neighbors in the first-level domain via the links in the dashed circle 810. Node_1 also actively monitors another three nodes (M−1=3) in the $2^{nd}$-level via the links in the dashed circle 820, and another three nodes $$\left(\frac{N}{M^2} - 1 = 3\right)$$

in the $3^{rd}$-level via the links in the dashed circle 830. For each node, there are $$(M-1)+(M-1)+\left(\frac{N}{M^2}-1\right)=9$$

actively monitored links. Thus, for the three-level monitoring scheme, in total there are $$N\times\left((M-1)+(M-1)+\left(\frac{N}{M^2}-1\right)\right)=576$$

actively monitored links.

FIG. 9 is a table 900 illustrating the number of actively monitored links per node and the total number of actively monitored links for a full-mesh monitoring scheme, a two-level monitoring scheme and a three-level monitoring scheme. From the table 900, it can be seen that the background monitoring load, which is proportional to the number of actively monitored links, of the hyperscaled monitoring schemes has a lower growth rate when N increases as compared with the full-mesh monitoring scheme. Furthermore, the table 900 shows that the three-level monitoring scheme has a lower growth rate when N increases than the two-level monitoring scheme.

Although the two-level and three-level monitoring schemes are described above, it is understood that the hyperscaled monitoring scheme can be extended to levels that are higher than three. In general for a K-level scheme (K being an integer>2), M may be calculated as $$\operatorname{ceil}(\sqrt[K]{N}).$$

the domains form a K-level hierarchy of N nodes. Each first-level domain is composed of the nodes, each $2^{nd}$-level domain is composed of first-level domains, and each Kth-level domain is composed of (K−1)th-level domains. The total number of actively monitored links, and therefore the background monitoring load, can be reduced with higher levels of hyperscaled schemes; however, complexity of the schemes also increases with higher levels.

Figure 10:
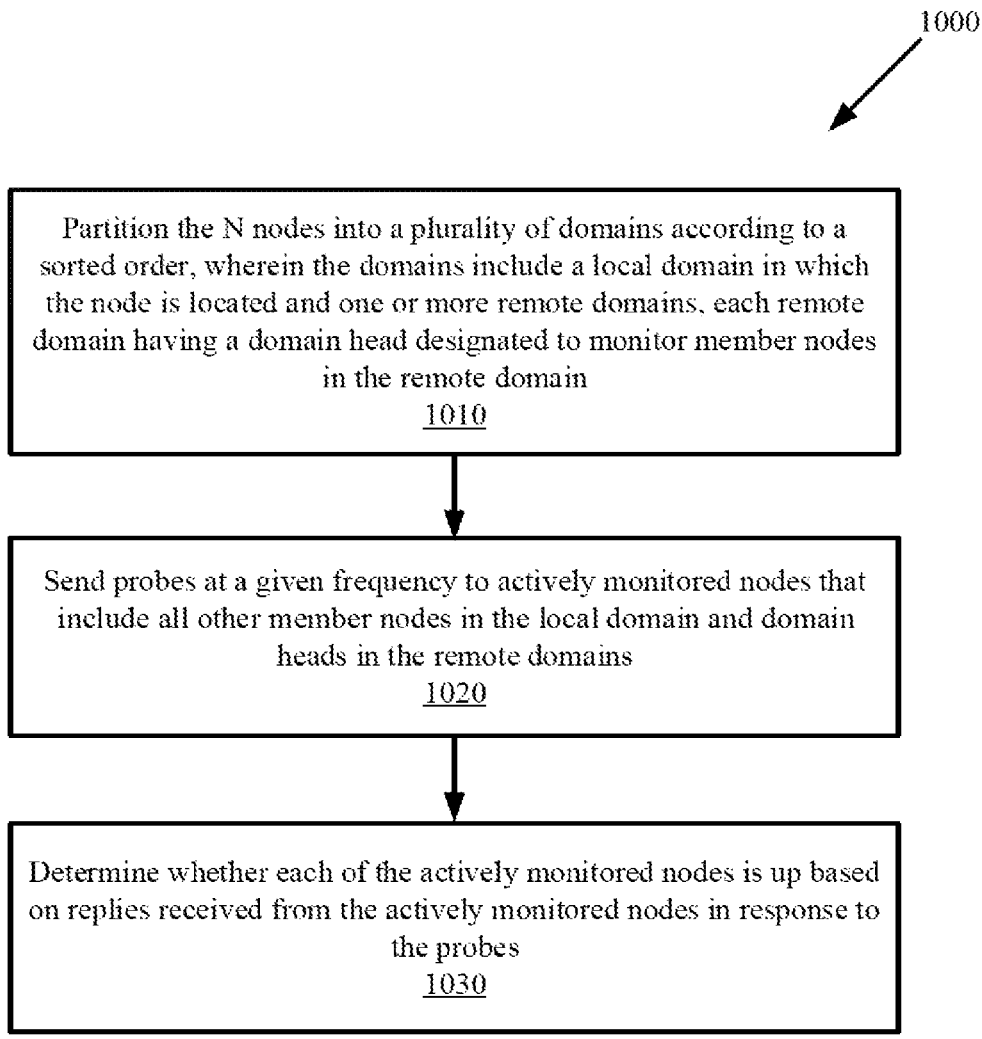
FIG. 10 is a flow diagram illustrating a method for monitoring a network of N nodes according to one embodiment.

FIG. 10 is a flow diagram illustrating a method 1000 for monitoring a network of N nodes according to one embodiment. The method 1000 is performed by each node of the N nodes. Thus, the term "the node" in the following refers to each node in the network. The method 1000 begins at step 1010 with the node partitioning the N nodes into domains according to a sorted order. The domains include a local domain in which the node is located and one or more remote domains. Each remote domain has a domain head designated to monitor member nodes in the remote domain. At step 1020, the node sends probes at a given frequency to actively monitored nodes that include all other member nodes in the local domain and domain heads in the remote domains. At step 1030, the node determines whether each of the actively monitored nodes is up based on replies received in response to the probes.

The hyperscaled node monitoring schemes described above may be used in a network that operates according to the TIPC protocol. However, the hyperscaled node monitoring schemes can also be used in networks that operate according to a different protocol, such as the Transmission Control Protocol (TCP) or other protocols.

Figure 11A:
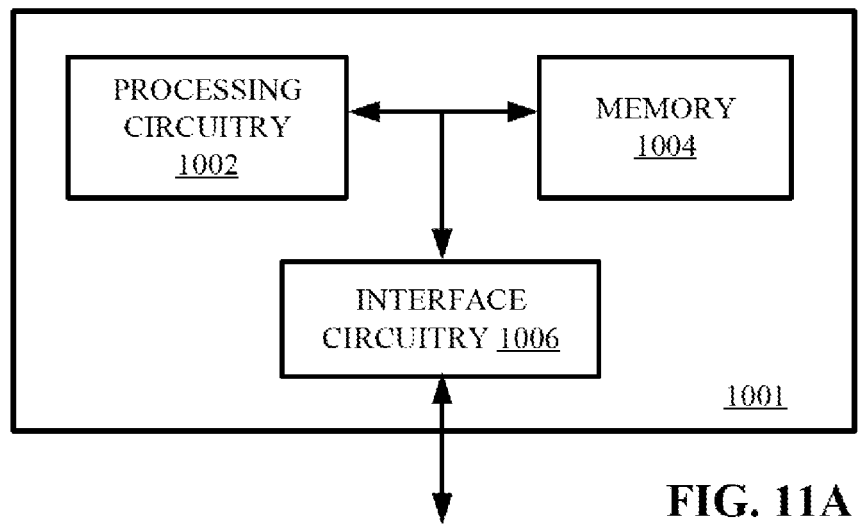
FIG. 11A is a block diagram of a network node according to one embodiment.

FIG. 11A is a block diagram illustrating a network node 1001 according to an embodiment. In one embodiment, the network node 1001 may be a server in an operator network or in a data center. The network node 1001 includes circuitry including processing circuitry 1002, a memory or instruction repository 1004 and interface circuitry 1006. The interface circuitry 1006 can include at least one input port and at least one output port. The memory 1004 contains instructions executable by the processing circuitry 1002 whereby the network node 1001 is operable to perform the various embodiments as described herein, including the method 1000 of FIG. 10.

Figure 11B:
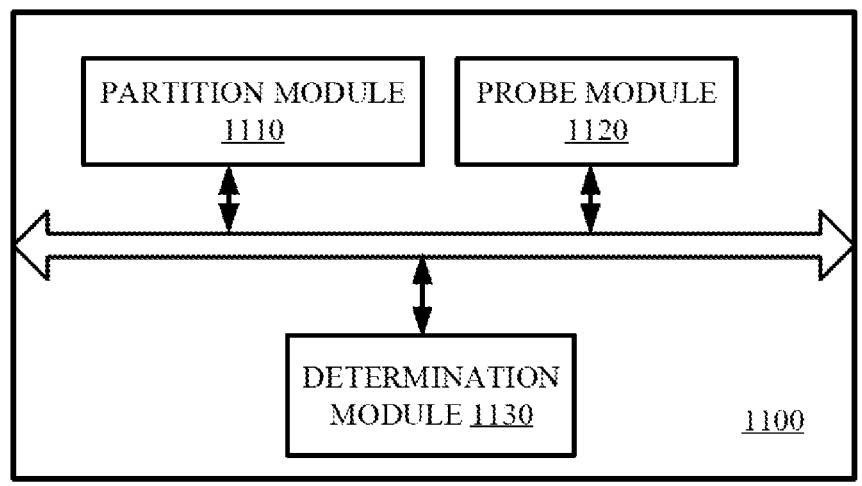
FIG. 11B is a block diagram of another network node according to one embodiment.

FIG. 11B is a block diagram of an example network node 1100 that includes a plurality of modules. In one embodiment, the network node 1100 may be a server in an operator network or in a data center. The network node 1100 includes a partition module 1110 adapted or operative to partition the N nodes into domains according to a sorted order. The domains include a local domain in which the node is located and one or more remote domains. Each remote domain has a domain head designated to monitor member nodes in the remote domain. The network node 1100 also includes a probe module 1120 adapted or operative to send probes at a given frequency to actively monitored nodes that include all other member nodes in the local domain and domain heads in the remote domains, and a determination module 1130 adapted or operative to determine whether each of the actively monitored nodes is up based on replies received in response to the probes. The network node 1100 can be configured to perform the various embodiments as have been described herein.

Figure 12:
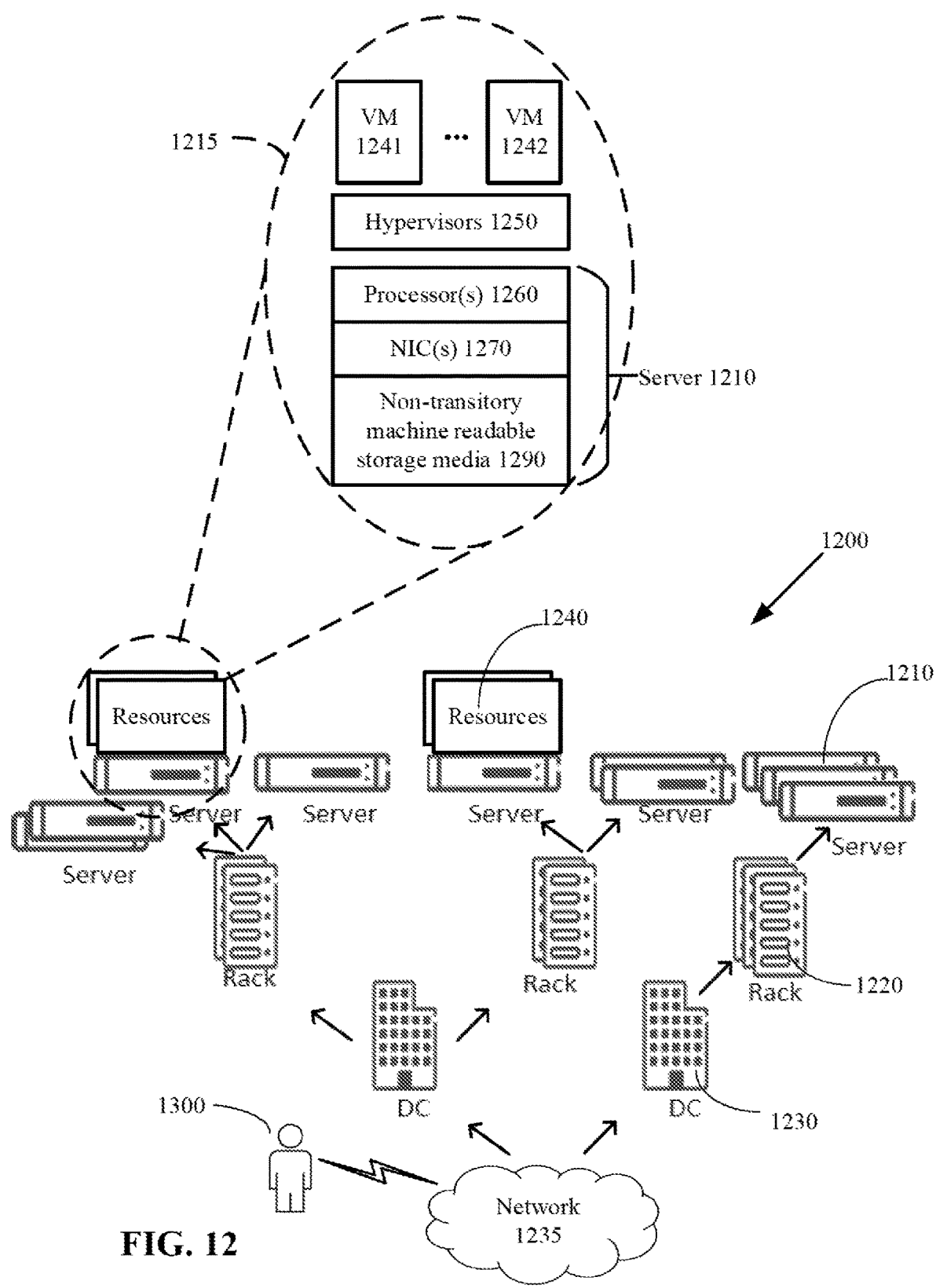
FIG. 12 is an architectural overview of a cloud computing environment according to one embodiment.

FIG. 12 is an architectural overview of a cloud computing environment 1200 that comprises a hierarchy of a cloud computing entities. The cloud computing environment 1200 can include a number of different data centers (DCs) 1230 at different geographic sites connected over a network 1235. Each data center 1230 site comprises a number of racks 1220, each rack 1220 comprises a number of servers 1210. It is understood that in alternative embodiments a cloud computing environment may include any number of data centers, racks and servers. A set of the servers 1210 may be selected to host resources 1240. In one embodiment, the servers 1210 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead.

Further details of the server 1210 and its resources 1240 are shown within a dotted circle 1215 of FIG. 12, according to one embodiment. The cloud computing environment 1200 comprises a general-purpose network device (e.g. server 1210), which includes hardware comprising a set of one or more processor(s) 1260, which can be commercial off-the-shelf (COTS) processors, dedicated Application Specific Integrated Circuits (ASICs), or any other type of processing circuit including digital or analog hardware components or special purpose processors, and network interface controller(s) 1270 (NICs), also known as network interface cards, as well as non-transitory machine readable storage media 1290 having stored therein software and/or instructions executable by the processor(s) 1260.

During operation, the processor(s) 1260 execute the software to instantiate a hypervisor 1250 and one or more VMs 1241, 1242 that are run by the hypervisor 1250. The hypervisor 1250 and VMs 1241, 1242 are virtual resources, which may run node instances in this embodiment. In one embodiment, the node instance may be implemented on one or more of the VMs 1241, 1242 that run on the hypervisor 1250 to perform the various embodiments as have been described herein. In one embodiment, the node instance may be instantiated as a network node performing the various embodiments as described herein, including the method 1000 of FIG. 10.

In an embodiment, the node instance instantiation can be initiated by a user 1300 or by a machine in different manners. For example, the user 1300 can input a command, e.g., by clicking a button, through a user interface to initiate the instantiation of the node instance. The user 1300 can alternatively type a command on a command line or on another similar interface. The user 1300 can otherwise provide instructions through a user interface or by email, messaging or phone to a network or cloud administrator, to initiate the instantiation of the node instance.

Embodiments may be represented as a software product stored in a machine-readable medium (such as the non-transitory machine readable storage media 1290, also referred to as a computer-readable medium, a processor-readable medium, or a computer usable medium having a computer readable program code embodied therein). The non-transitory machine-readable medium 1290 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software miming from the machine-readable medium may interface with circuitry to perform the described tasks.

The above-described embodiments are intended to be examples only. Alterations, modifications and variations may be effected to the particular embodiments by those of skill in the art without departing from the scope which is defined solely by the claims appended hereto.

What is claimed is:

1. A method for monitoring a network of N nodes, the method comprising:
   partitioning, by a first node, a subset of nodes from the N nodes into a domain according to a sorted order, the domain overlapping with one or more of (N−1) domains partitioned by the rest of the N nodes, wherein the domain includes a local domain in which the first node is located and the domain is associated with one or more remote domains, the one or more remote domains being respective local domains of one or more remote nodes, the one or more remote nodes monitoring a state of all the nodes in the network with the first node;
   sending probes at a given frequency to actively monitored nodes that include all other member nodes in the local domain and the one or more remote nodes in the one or more remote domains; and
   determining whether each of the actively monitored nodes is up based on replies received from the actively monitored nodes in response to the probes.

2. The method of claim 1, wherein partitioning the number of nodes further comprises:
   setting up the local domain to include a sequence of M nodes in the sorted order with the first node being the first of the sequence, wherein M is a size of the local domain.

3. The method of claim 1, wherein partitioning the subset of nodes further comprises:
   designating one node in the local domain as a domain head for one of the one or more remote domains; and
   setting up said remote domain based on a local domain reported by the domain head.

4. The method of claim 1, further comprising:
   storing, in a memory of the first node, a domain record identifying the member nodes in the local domain.

5. The method of claim 1, further comprising:
   storing, in a memory of the first node, an enhanced domain record identifying the member nodes in the local domain, and, for each member node, recording an up or down state and a generation identifier that is incremented each time the member node's local domain changes.

6. The method of claim 1, further comprising:
   broadcasting a domain event to all of the nodes in the network upon detecting a change in the local domain, wherein the domain event is one of a node addition event, a node removal event, a node up event and a node down event.

7. The method of claim 6, further comprising:
   broadcasting a domain record when the domain event is the node addition event or the node removal event, wherein the domain record identifies the member nodes in the local domain; and
   broadcasting an identifier of a downed node when the domain event is the node down event or the node up event.

8. The method of claim 1, further comprising:
   receiving, from a second node in the network, a domain event indicating that a third node in the network is down; and
   sending one or more confirmation probes to the third node in response to the domain event until one of following conditions is satisfied, the conditions including: the third node responds, a pre-determined number of confirmation probes have been left unresponded by the third node, and another domain event is received from a fourth node in the network indicating that the third node is down.

9. The method of claim 1, further comprising:
   detecting from a reported domain record from one of the one or more remote nodes that said remote node and the first node have different network views; and
   truncating the reported domain record immediately before a first mismatched node, at which the reported domain record does not match the first node's network view.

10. The method of claim 1, further comprising:
    detecting an addition or a removal of a given node in the network; and
    re-calculating a size of the local domain according to an updated value of N; and
    updating membership of the domains and re-designating the domain heads.

11. A first node in a network of N nodes, the first node adapted to monitor the N nodes collaboratively with the N nodes, the first node comprising:
a circuitry adapted to cause the first node to:
partition a subset of nodes from the N nodes into a domain according to a sorted order, the domain overlapping with one or more (N−1) domains partitioned by the rest of the N nodes, wherein the domain includes a local domain in which the first node is located and the domain is associated with one or more remote domains, the one or more remote domains being respective local domains of one or more remote nodes, wherein the one or more remote nodes monitor a state of all the nodes in the network with the first node;
send probes at a given frequency to actively monitored nodes that include all other member nodes in the local domain and the one or more remote nodes in the one or more remote domains; and
determine whether each of the actively monitored nodes is up based on replies received from the actively monitored nodes in response to the probes.

12. The first node of claim 11, wherein the circuitry is further adapted to cause the first node to:
sort the N nodes using a same sorting algorithm as all other nodes in the network, on a same set of numerical representations of the N nodes, wherein a numerical representation of any node in the network is one of: a numerical identifier, a hash value of the numerical identifier, and a mapped value of the numerical identifier.

13. The first node of claim 11, wherein the circuitry is further adapted to cause the first node to: calculate a size of the local domain, M, as equal to the ceiling of $$(\sqrt[2]{N}).$$

14. The first node of claim 13, wherein the circuitry is further adapted to cause the first node to:
set up the local domain to include a sequence of M nodes in the sorted order with the first node being the first of the sequence.

15. The first node of claim 11, wherein the circuitry is further adapted to cause the first node to:
designate one node in the local domain as a domain head for one of the one or more remote domains; and
set up said remote domain based on a local domain reported by the domain head.

16. The first node of claim 11, wherein the circuitry is further adapted to cause the node to:
store, in a memory of the first node, a domain record identifying the member nodes in the local domain.

17. The first node of claim 16, wherein the circuitry is further adapted to cause the first node to:
send the domain record to a node that is newly added to the network upon establishing a link to the newly added node.

18. The first node of claim 11, wherein the circuitry is further adapted to cause the first node to:
store, in a memory of the first node, an enhanced domain record that identifies the member nodes in the local domain, and, for each member node, records an up or down state and a generation identifier that is incremented each time the member node's local domain changes.

19. The first node of claim 18, wherein the circuitry is further adapted to cause the node to:
send the enhanced domain record with each probe and each reply to a received probe.

20. The first node of ef claim 11, wherein the circuitry is further adapted to cause the first node to:
broadcast a domain event to all of the nodes in the network upon detecting a change in the local domain, wherein the domain event is one of a node addition event, a node removal event, a node up event and a node down event.

21. The first node of claim 20, wherein the circuitry is further adapted to cause the first node to:
broadcast a domain record when the domain event is the node addition event or the node removal event, wherein the domain record identifies the member nodes in the local domain; and
broadcast an identifier of a downed node when the domain event is the node down event or the node up event.

22. The first node of claim 11, wherein the circuitry is further adapted to cause the first node to:
receive, from a second node in the network, a domain event indicating that a third node in the network is down; and
send one or more confirmation probes to the third node in response to the domain event until one of following conditions is satisfied, the conditions including: the third node responds, a pre-determined number of confirmation probes have been left unresponded by the third node, and another domain event is received from a fourth node in the network indicating that the third node is down.

23. The first node of claim 11, wherein the circuitry is further adapted to cause the node to:
send confirmation probes in round robin to all nodes in each remote domain excluding the domain head at a second frequency per node, wherein the second frequency is lower than the given frequency.

24. The first node of claim 11, wherein the circuitry is further adapted to cause the first node to:
detect from a reported domain record from one of the one or more remote nodes that said remote node and the first node have different network views; and
truncate the reported domain record immediately before a first mismatched node, at which the reported domain record does not match the node's network view.

25. The first node of claim 11, wherein the domain partitioned by the first node and the (N−1) domains partitioned by the rest of the N nodes form a K-level hierarchy of the N nodes, and wherein each Kth-level domain is composed of a set of (K−1)th-level domains, K being an integer that is at least 2.

26. The node of claim 25, wherein the circuitry is further adapted to cause the first node to:
calculate a size of the local domain, M, as equal to ceil $$(\sqrt[K]{N}).$$

27. The first node of claim 11, wherein the circuitry is further adapted to cause the first node to:
detect an addition or a removal of a given node in the network; and
re-calculate a size of the local domain according to an updated value of N; and update membership of the domains and re-designate the domain heads.

* * * * *

UNITED STATES PATENT AND TRADEMARK OFFICE
CERTIFICATE OF CORRECTION

PATENT NO. : 10,873,514 B2
APPLICATION NO. : 16/079413
DATED : December 22, 2020
INVENTOR(S) : Jon Maloy It is certified that error appears in the above-identified patent and that said Letters Patent is hereby corrected as shown below:

On the Title Page

On Page 2, in Item (56), under "OTHER PUBLICATIONS", in Column 1, Line 1, delete "et al:" and insert -- et al.: --, therefor.

In the Specification

In Column 2, Line 41, delete "miming" and insert -- running --, therefor.

In Column 4, Lines 42-44, delete "In One Embodiment, Node_1 Calculates the Local Domain Size M from N According to a Pre-Determined Formula; e.g., the Ceiling of" and insert -- In one embodiment, Node_1 calculates the local domain size M from N according to a pre-determined formula; e.g., the ceiling of --, therefor.

In Column 4, Line 50, delete "all" and insert -- an --, therefor.

In Column 12, Lines 31-34, delete " $T = N \times \left((M - 1) + \left(\left(\frac{N}{M} - 1\right)\right)\right).$ " and insert -- $T = N \times \left((M - 1) + \left(\frac{N}{M} - 1\right)\right).$ --, therefor.

In Column 15, Line 43, delete "miming" and insert -- running --, therefor.

In the Claims

In Column 18, Line 5, in Claim 20, delete "node of ef claim" and insert -- node of claim --, therefor.

In Column 18, Line 54, in Claim 26, delete "The node" and insert -- The first node --, therefor.

Signed and Sealed this
Eleventh Day of January, 2022

Drew Hirshfeld
*Performing the Functions and Duties of the
Under Secretary of Commerce for Intellectual Property and
Director of the United States Patent and Trademark Office*